March 31, 1970
J. WALTER
3,503,828
APPARATUS FOR MANUFACTURING HERMETIC
PLASTICS TUBES HAVING A BINDING
Filed June 15, 1966
12 Sheets-Sheet 1
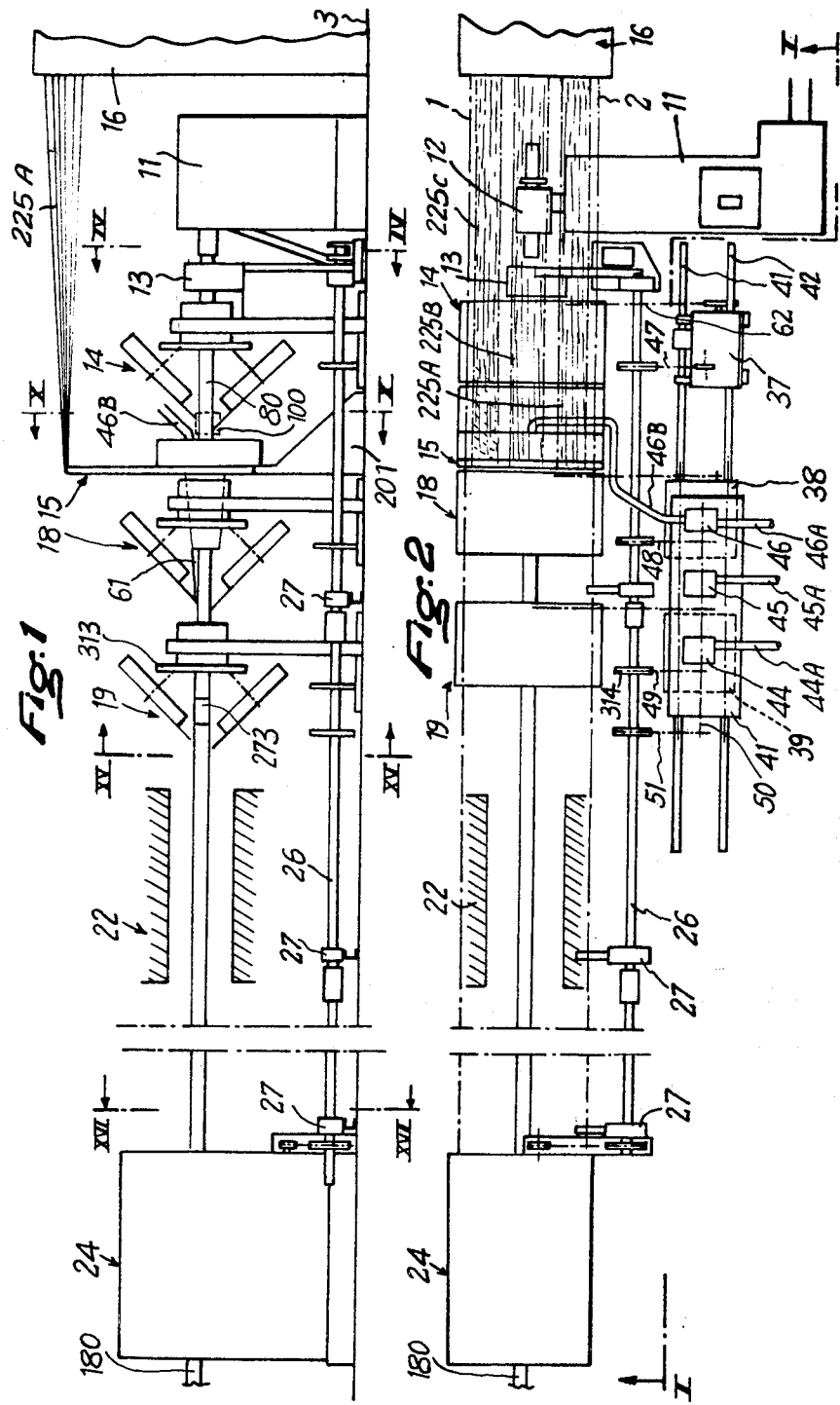
INVENTOR
JACQUES WALTER
By Mulslain and Toren
attorneys

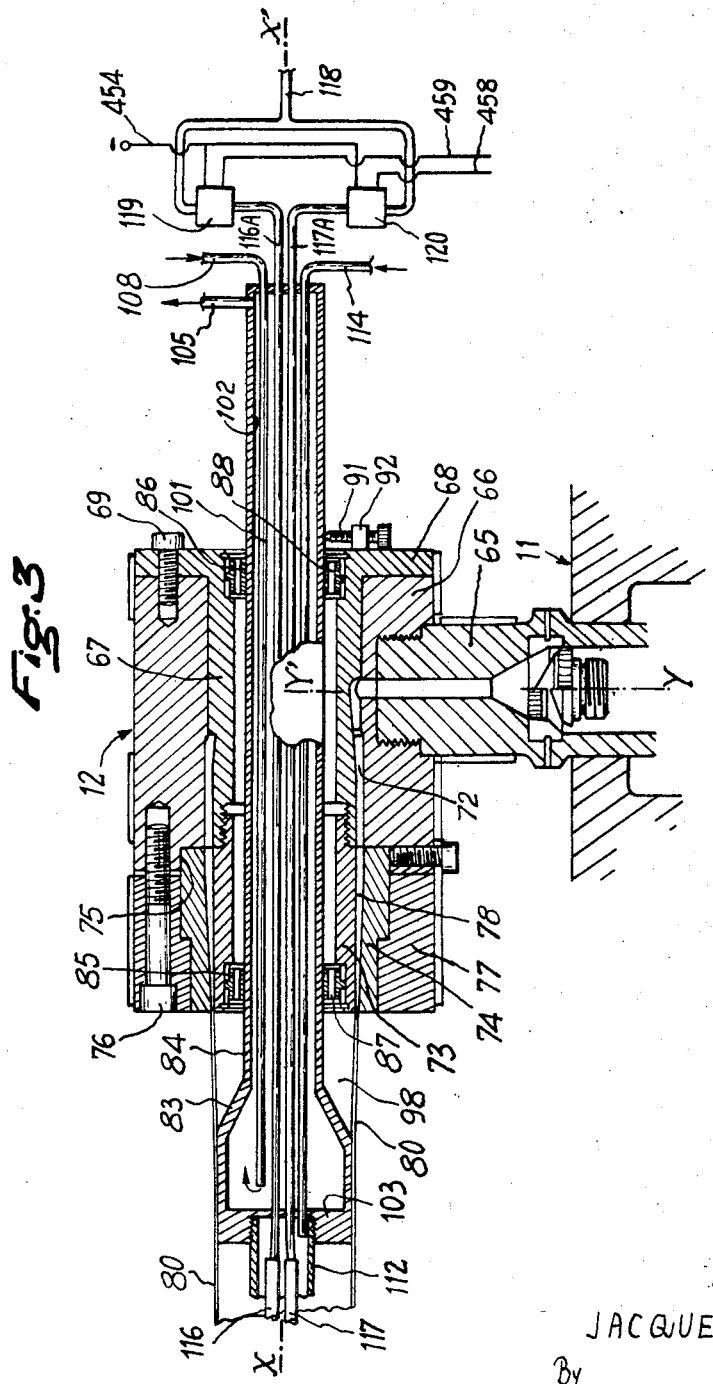

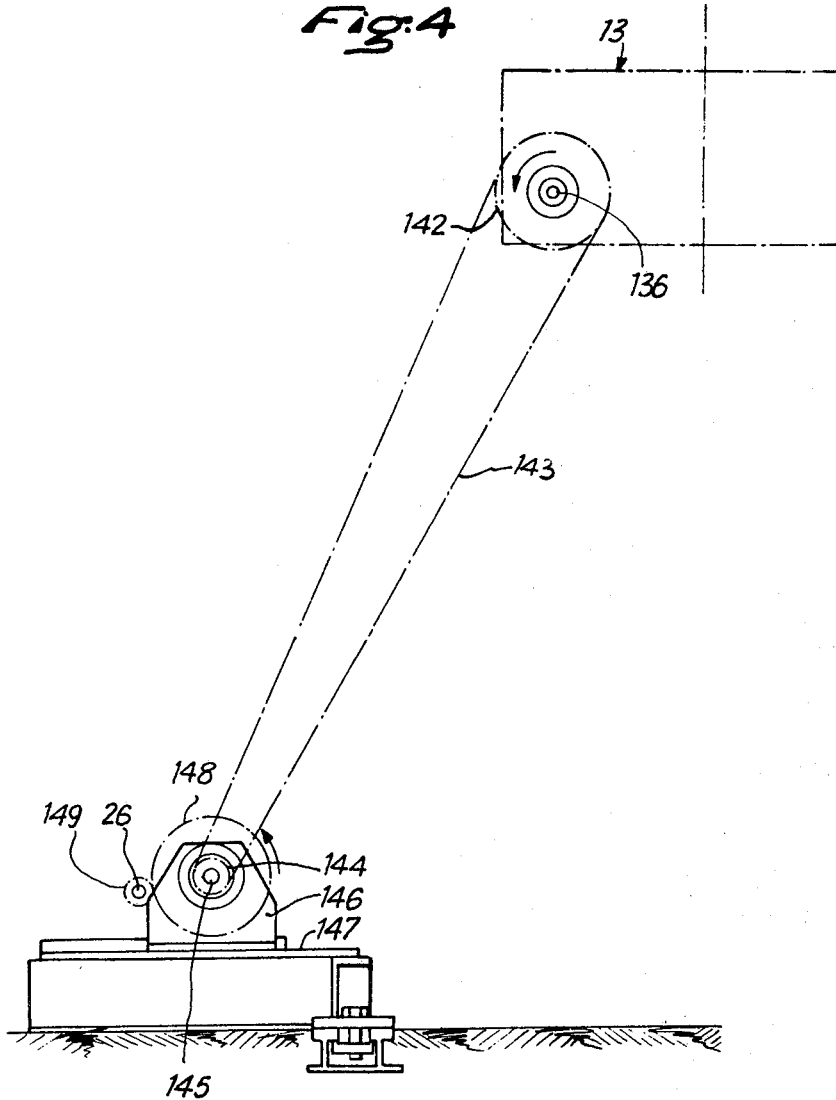

March 31, 1970     J. WALTER     3,503,828
APPARATUS FOR MANUFACTURING HERMETIC
PLASTICS TUBES HAVING A BINDING
Filed June 15, 1966     12 Sheets-Sheet 4
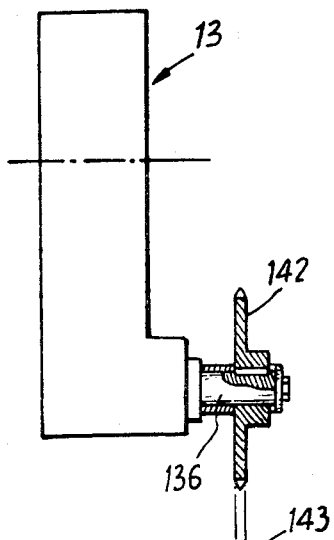
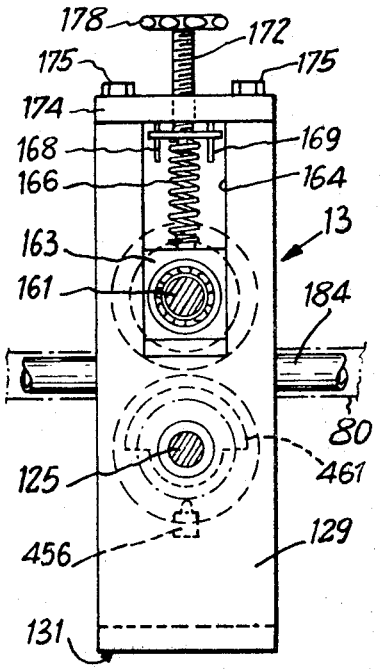
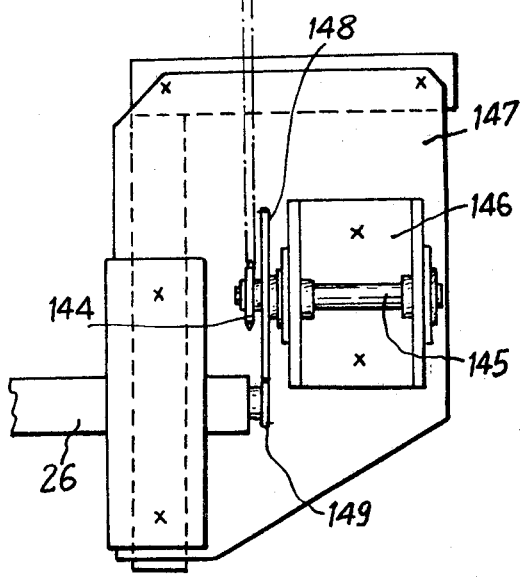
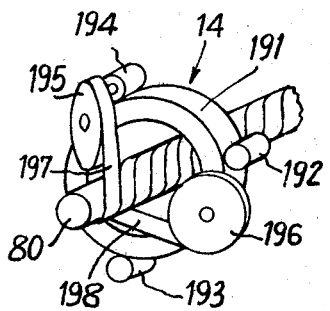
INVENTOR
JACQUES WALTER

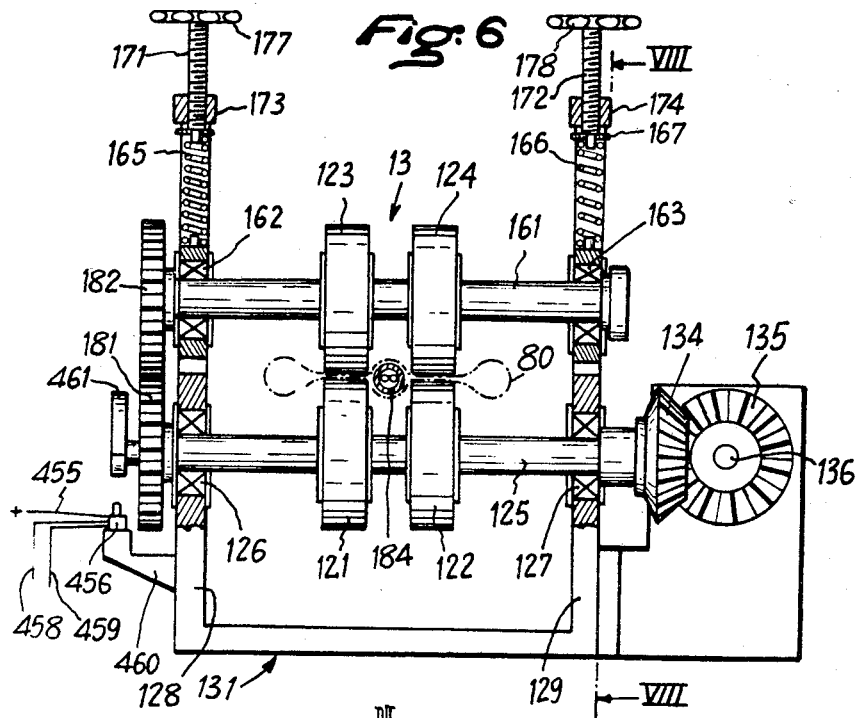
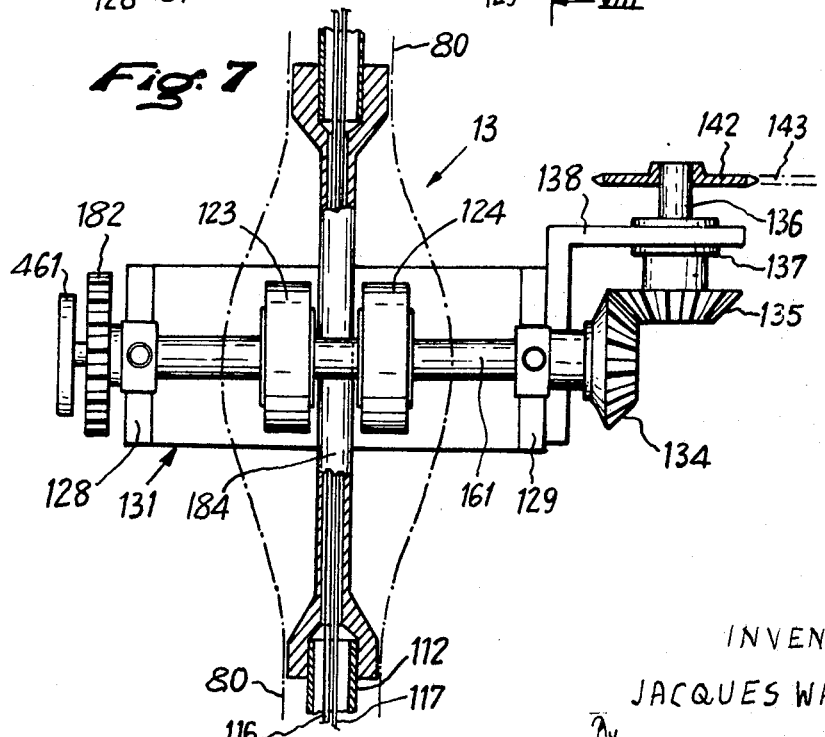

March 31, 1970  
J. WALTER  
3,503,828  
APPARATUS FOR MANUFACTURING HERMETIC  
PLASTICS TUBES HAVING A BINDING  
Filed June 15, 1966  
12 Sheets-Sheet 6
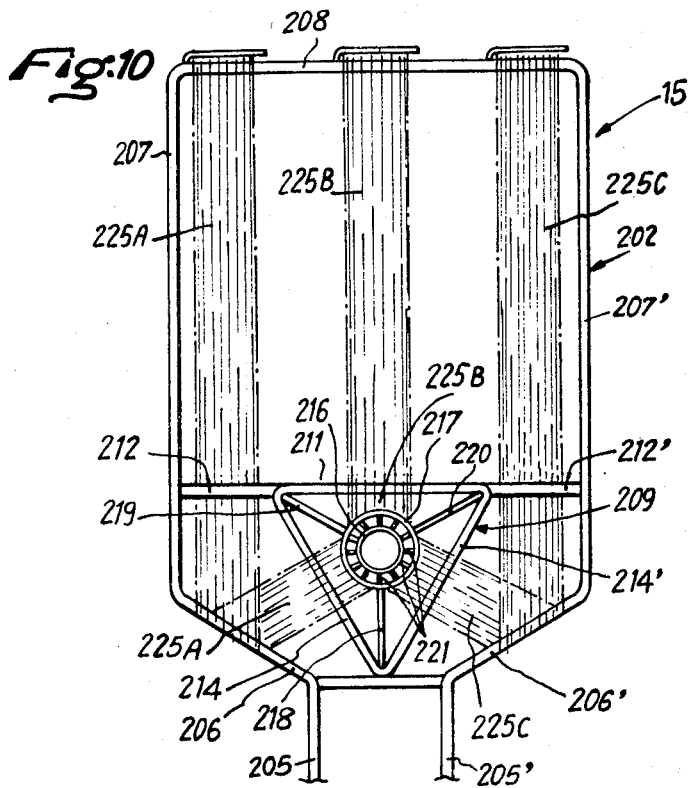
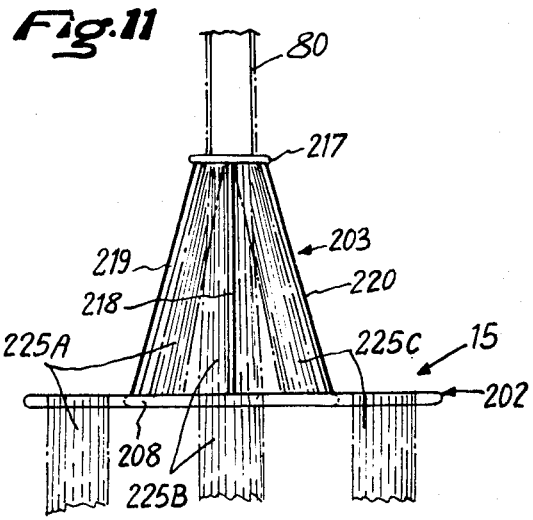
INVENTOR  
JACQUES WALTER  
By Munflaw and Toren  
attorneys March 31, 1970 J. WALTER 3,503,828
APPARATUS FOR MANUFACTURING HERMETIC
PLASTICS TUBES HAVING A BINDING
Filed June 15, 1966 12 Sheets-Sheet 7
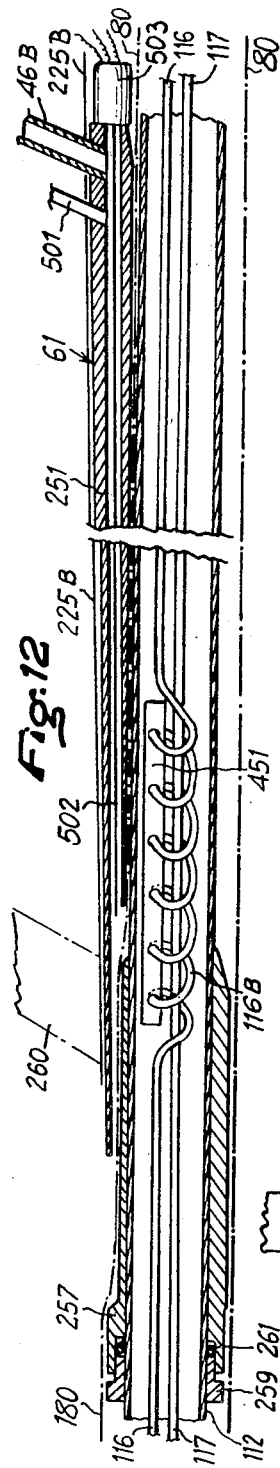
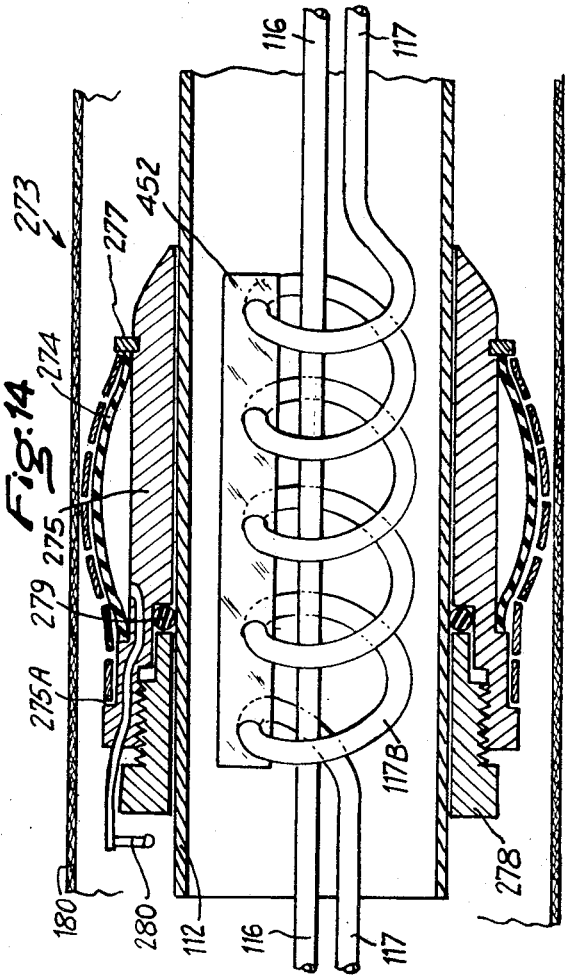
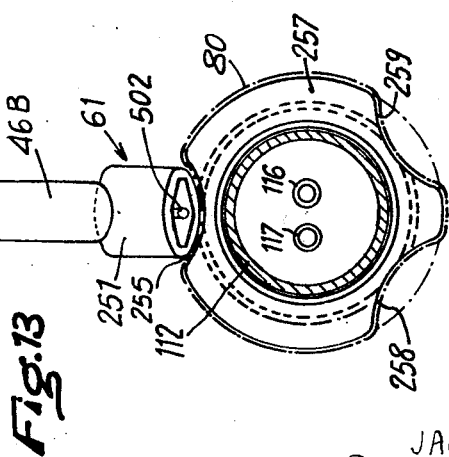
INVENTOR
JACQUES WALTER

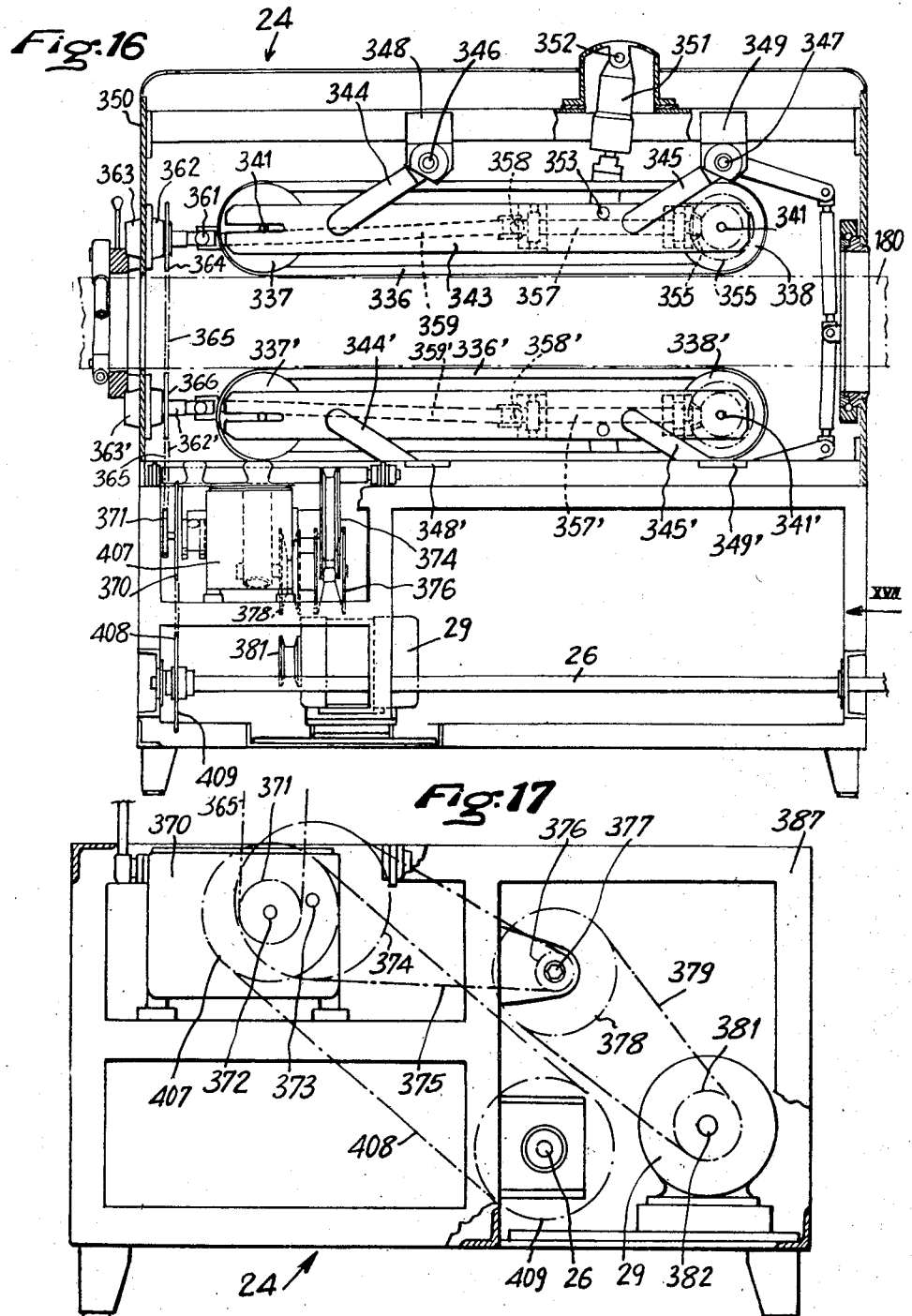

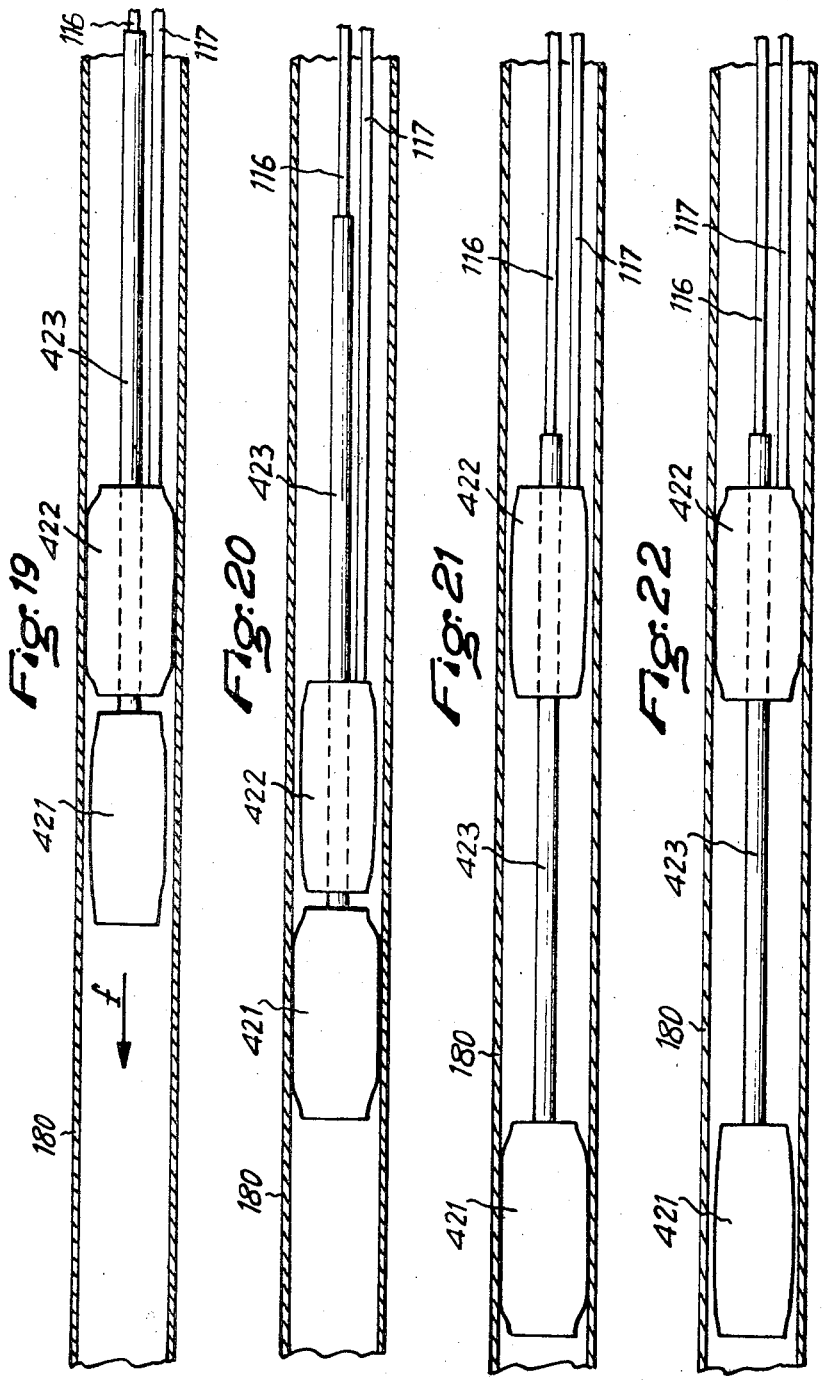

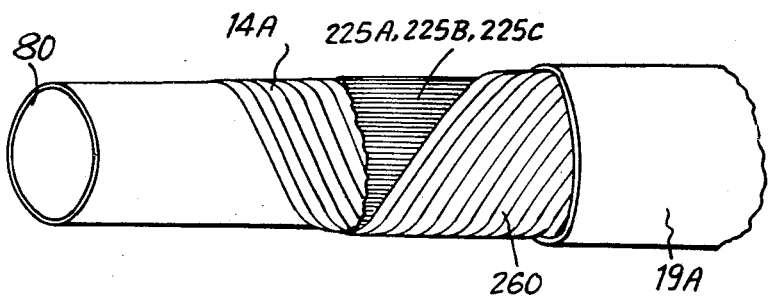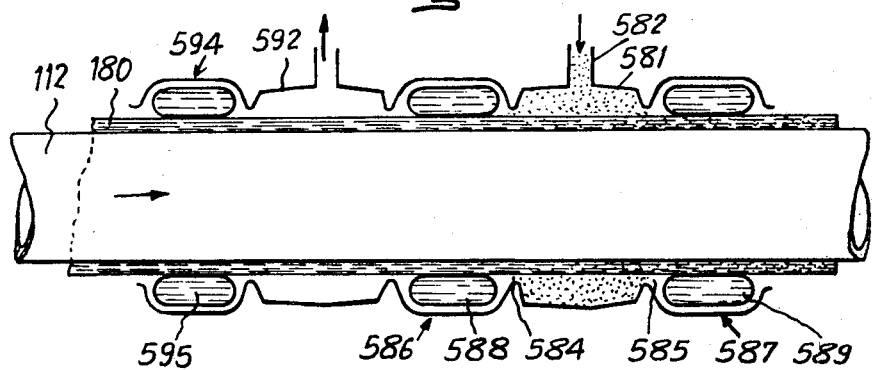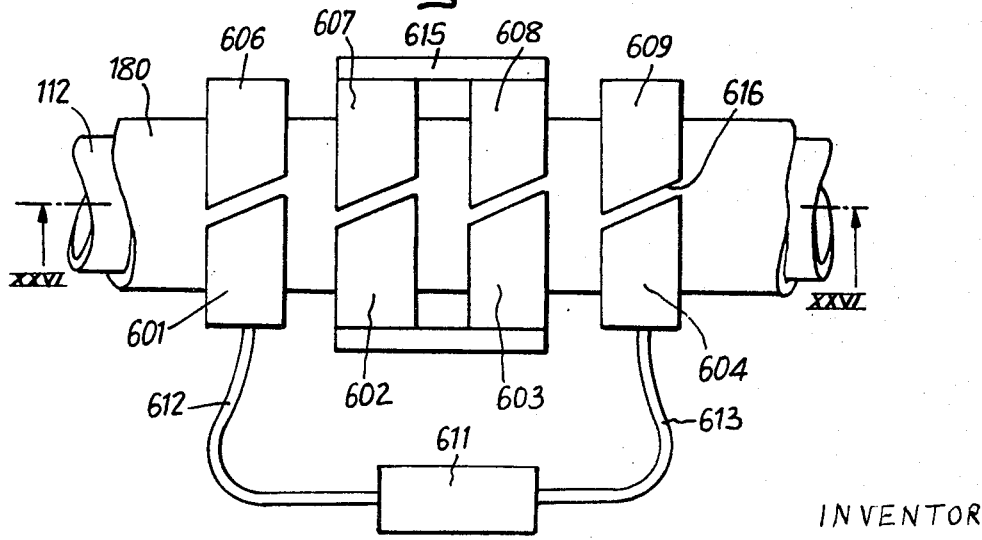

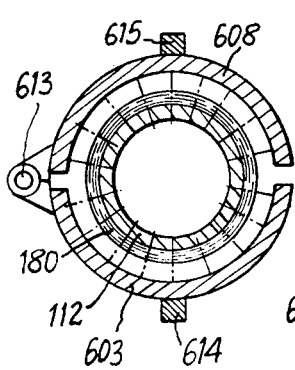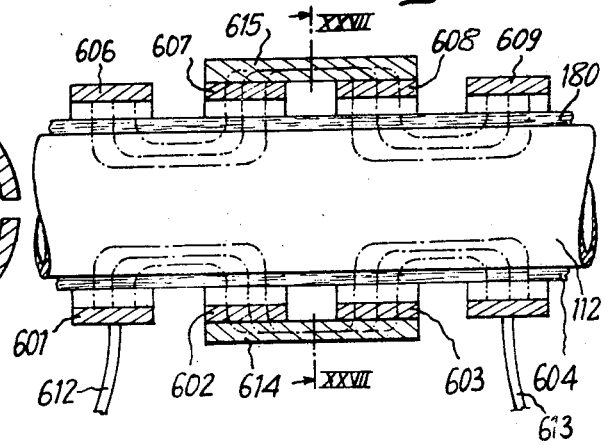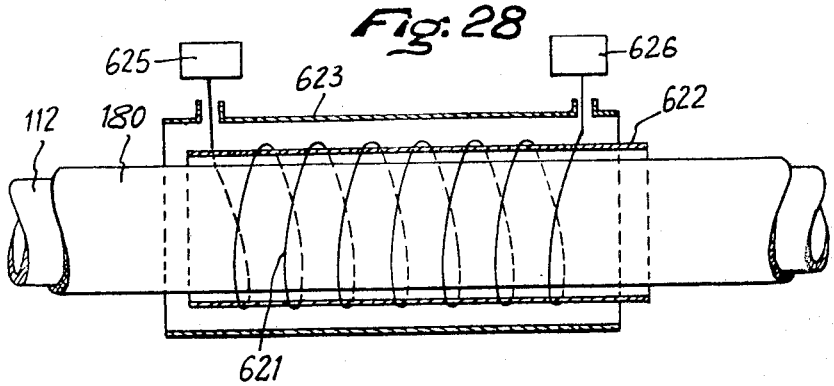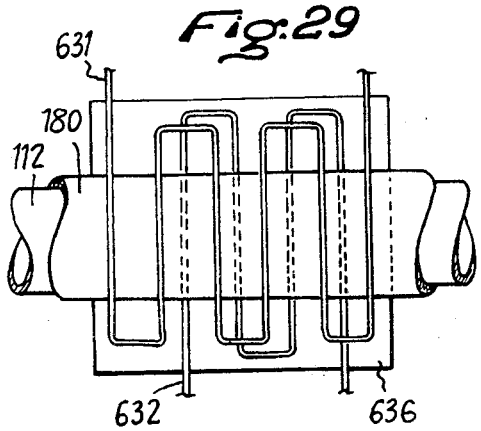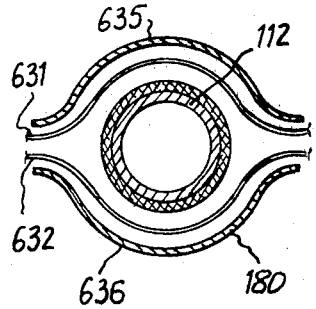

United States Patent Office

3,503,828
Patented Mar. 31, 1970

3,503,828
APPARATUS FOR MANUFACTURING HERMETIC PLASTICS TUBES HAVING A BINDING
Jacques Walter, 14 Rue Crespin, Geneva, Switzerland
Filed June 15, 1966, Ser. No. 557,737
Claims priority, application France, June 19, 1965, 21,545; Sept. 6, 1965, 30,487; Sept. 9, 1965, 30,859; Sept. 25, 1965, 32,721; Nov. 17, 1965, 38,726; Nov. 20, 1965, 39,189
Int. Cl. B32b *31/30, 31/12*
U.S. Cl. 156—382    22 Claims

ABSTRACT OF THE DISCLOSURE

Apparatus for forming hermetic plastics tubes having a reinforcing binding comprises means for fabricating a relatively thin plastic sheath and an inner tubular cylindrical sizing mandrel having an external diameter equal to the internal diameter of the sheath and over which sheath extracting means move the sheath as it is fabricated. The diameter of the mandrel is less than the diameter of the fabricated sheath except at the exit of an extruder, below means for placing reinforcing filaments or tapes on the sheath, and in a zone associated with a stationary gasket for retaining sheath pressurizing fluid. Downstream of the sheath extracting means there are provided means for placing reinforcing filaments, fibers, or tapes, in dry condition, on the sheath and means for injecting a curable plastic, in the fluid state, into intimate relation with the reinforcing elements. A curing arrangement follows the plastic injection arrangement and is, in turn, followed by a second extracting means for the completed tube. During application of the reinforcing materials and the curable resins, the sheath is maintained under super atmospheric pressure by means closing the downstream end of the sheath. The upstream end of the sheath, adjacent the first extracting means, is maintained in communication with the atmosphere.

BACKGROUND AND SUMMARY OF THE INVENTION

This invention relates to the manufacture of hermetic plastics tubes, having a binding or serving, by means of a technique based on the general principle, which is known, of combining a thin hermetic low-strength tube or sheath with a binding of glass fibers impregnated with a resin, such as an epoxy resin or a polyester resin. This binding on its own is strong but not sealing-tight. The combination of the tube with the binding provides an article which is sealing-tight and strong. It is an object of this invention to manufacture such a tube continuously.

To this end, the apparatus according to the invention, for manufacturing tubes formed by a hermetic but low-strength plastics sheath having a binding of a strong but non-hermetic laminate, comprises in combination:

Means for continuously fabricating a plastics sheath;

An inner tubular cylindrical sizing mandrel disposed at the exit of the sheath fabricating means and having an external diameter equal to the internal diameter of the sheath;

Sheath-extracting means adapted to move the sheath axially on the sizing mandrel, and disposed at a reduced distance therefrom;

Means for placing, on the sheath reinforcing filaments or fibers or tapes, in dry condition; and Means for injecting a curable plastics, in the liquid state, between the reinforcing elements.

The inventor has found that tube quality improves considerably if the tube is, during fabrication, kept filled with a pressure fluid, such as air compressed to a pressure, for instance, of 2 kg./cm.$^2$. To maintain the pressure inside the tube, the exit thereof must have closure means at the downstream end of the apparatus. A simple and effective way of closing the downstream end of the tube is just to secure a plug in such end. However, this is a very inconvenient form of closure, for in continuous production it becomes necessary to part off a length of finished tube after some time, so that the tube is opened and the pressure of the fluid therein drops. However rapidly it is possible to perform this operation of cross-cutting the tube and placing a plug on the new end, the apparatus is bound to produce some length of unpressurized and therefore low-quality tube.

Another simple and convenient system is for a conventional lipped gasket to be provided at the downstream end of the mandrel. Unfortunately, the gasket scrapes the inside surface of the still hot tube and damages the inner film required to provide sealing-tightness. Also, irregularities in tube diameter periodically cause either jamming, if the tube is too small, or a leakage of pressure fluid, if the tube is too large.

The invention obviates this difficulty in two ways. The first way is to secure, to an extension of the sizing mandrel, a plug formed by an inflated flexible resilient diaphragm covered by low-friction elements, for instance, of "Teflon." The second way is for the apparatus to comprise, inside that portion of the fabricated tube which is at the downstream end of the apparatus, a system comprising two movable plugs adapted to be selectively inflated alternately into clamping engagement with the inner wall of the fabricated tube, so that each inflated plug is alternately moved along with the tube while the other plug is in the deflated state and can slide freely inside the tube, means being provided to return the deflated plug in the upstream direction.

To greatly reduce friction between the fabricated tube and the mandrel, the diameter of the latter is made much less than the diameter of the fabricated tube except at the extruder exit, for sheath sizing, below the means for placing the reinforcing filaments or tapes on the sheath, to ensure accurate winding, and in the zone associated with a stationary gasket for retaining the sheath-pressurizing fluid.

The invention is equally of use with thermosetting resins and with thermofusible plastics. In the case of thermosetting resins, the apparatus comprises heating means for curing polymerization of the resin, whereas in the case of thermofusible plastics the apparatus comprises heating means for melting the thermofusible plastics which, after deposition on the sheath, set as it cools.

In one embodiment, thermosetting resin is injected through stationary longitudinal pipettes whose ends extend to the places where the reinforcing filaments or fibers or tapes are deposited dry on the sheath. Alternatively, the resin-injecting system comprises two cylindrical chambers through which the tube being formed passes consecutively, the first such chamber being connected to a negative pressure source and the second such chamber being connected to a pressurized resin reservoir.

According to another feature of the invention, either a centreless machine or a square-head extruder is provided, similar to the extruder at the head of the machine but devoid of mandrel, the tube which is being manufactured going through the square-head extruder which deposits thereon a material, such as flexible polyvinyl chloride, to form a final smooth protective and possibly colored outer layer.

The heading means for polymerization can comprise, for instance, an infra-red radiation oven of any appropriate conventional kind or a high-frequency system or a hyperfrequency electric circuit system.

As a variant, the heating means are disposed on the path of the resin before the same is deposited on the tube, the catalyst being supplied directly to the place where the resin is deposited on the tube.

The invention will be more readily understood from the following description and accompanying drawings which show, as non-limitative examples, some embodiments of a tube-manufacturing apparatus according to the invention and in which:

FIG. 1 is an overall elevation view of the apparatus in elevation and in section on the line I—I of FIG. 2, to a reduced scale;

FIG. 2 is a plan view corresponding to FIG. 1;

FIG. 3 is a view, to an enlarged scale and in longitudinal section, of the extruding head of the apparatus;

FIG. 4 is a view, to an enlarged scale and in cross-section on the line IV—IV of FIG. 1;

FIG. 5 is a plan view corresponding to FIG. 4;

FIG. 6 is a view to an enlarged scale, of the top part of FIG. 4 but looking toward the opposite surface and with some parts broken away;

FIG. 7 is a plan view corresponding to FIG. 6;

FIG. 8 is a section on the line VIII—VIII of FIG. 6;

FIG. 9 is a very diagrammatic perspective view of one of the three basic centreless devices of the apparatus;

FIG. 10 is a view to an enlarged scale, and in section on the line X—X of FIG. 1, showing the apparatus for feeding and placing longitudinal filaments on the sheath;

FIG. 11 is a plan view corresponding to FIG. 10;

FIG. 12 is a view in longitudinal section of a pipette for depositing resin on the sheath;

FIG. 13 is an end elevation corresponding to FIG. 12;

FIG. 14 is a view in longitudinal section of a gasket disposed on the mandrel;

FIG. 16 is a view to an enlarged scale in section on the line XVI—XVI of FIG. 1;

FIG. 17 is a side view of the bottom part of FIG. 16, looking in the direction indicated by an arrow XVII;

FIGS. 19–22 are diagrammatic views showing the system of two moving plugs during various phases of operation;

FIG. 23 shows one possible structure of a tube produced on the apparatus;

FIG. 24 is a view in longitudinal section of an alternative form of the system for impregnating the reinforcing filaments or layers with resin;

FIG. 25 shows a system for heating the tube by high frequency electric currents;

FIG. 26 is a view in longitudinal section on the line XXVI—XXVI of FIG. 25;

FIG. 27 is a cross-section on the line XXVII—XXVII of FIG. 26;

FIG. 28 shows a different heating system using a hyper-frequency circuit;

FIG. 29 shows a variant of FIG. 28 with the top reflector removed; and

FIG. 30 is an end view corresponding to FIG. 29.

Figure 15:
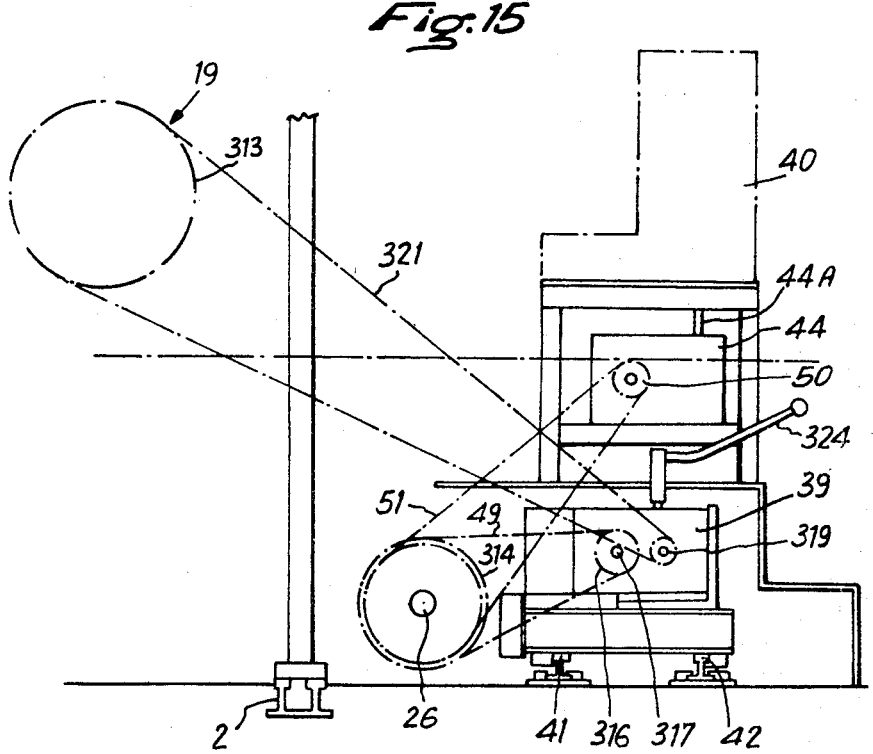
FIG. 15 is a view to an enlarged scale and in section on the line XV—XV of FIG. 1.

The apparatus, an overall view of which is given in diagrammatic form in FIGS. 1 and 2, is of use for manufacturing tubes comprising a sheath of hermetic low-strength plastics around which is a serving or binding of a strong non-hermetic laminate, and comprises a sequence of basic machines or devices all secured to two horizontal support rails 1, 2 embedded in or secured to the floor or ground 3. The elementary machines are a plastics extruder 11, for instance, for polyvinyl, and having a square head 12, a head extractor 13, for pulling the sheath out of the extruder head 12, a first centreless machine 14 for winding filaments or tapes around the sheath, a system 15 which places longitudinal filaments on the sheath and which is fed from any appropriate conventional bobbin creel 16, a second centreless machine 18, a third centreless machine 19, a hot polymerizing system 22 which will hereinafter be generally referred to as an "oven," and a caterpillar extractor 24. All of the elementary machines are driven by a horizontal drive shaft 26 which runs in stationary bearings 27 and is rotated by a single electric motor 29 (FIG. 17) disposed in the bottom part of the frame of the extractor 24, the drive being taken from the motor 29 to the shaft via a transmission which will be described hereinafter when the extractor 24 is studied.

Three resin pumps 44, 45, 46, disposed on a plate or tray or apron or the like 41 (FIGS. 2 and 15), are driven by the shaft 26 via a belt transmission 51. Their intake pipes 44A, 45A, 46A are connected to a resin tank 40 (FIG. 15) and their delivery pipes, such as 46B, are each connected to a pipette, as 61, disposed on a support member. More particulars of the pipette 61 will be given hereinafter.

FIG. 3 is a view to an enlarged scale of part of the extruder 11 comprising the head 12 whose geometric axis X–X' is perpendicular to the axis Y–Y' of the element 65 via which the plastics leaves the extruder. The extruder head 12 shown comprises a first tubular or annular member 66, into which the delivery element 65 is screwed radially, and a second tubular member 67 having a flange 68 enabling the member 67 to be secured by screws 69 to the tubular member 66.

In general and unless otherwise specified, since the raw material moves from right to left in the drawings for the complete apparatus and for each elementary machine, that part of the apparatus which is on the right in the drawings will be called the rear or up-stream part of the apparatus and that part of the apparatus which is on the left in the drawings will be called the front or downstream part.

The rear part of the tubular member 67 is a close fit in the bore in the tubular member 66 but its front part is of slightly reduced diameter so that an annular gap 72 is left between such front part and the corresponding portion of the bore in the member 66. Another tubular member 73 is screwed to the front end of the inner tubular member 67, and secured to the front surface of the outer tubular member 66 is another tubular member 74 which is centred in a matching rabbet or recess 75 in the member 66 and clamped there-against by screws 76 which extend through an annular flange 77. An annular gap 78 is left between the bore in the tubular member 74 and the outside surface of the tubular member 73 and communicates in its rearward part with the annular gap 72; towards the front the gap 78 reduces so as to deliver a plastics sheath 80 at the extruder head exit.

A gauging or sizing mandrel 83, disposed immediately at the extruder head exit, has a reduced tubular rear part 84 forming a rod supported in the extruder head by two annular members 85, 86 having axial holes 87, 88, respectively. The distance between the mandrel 83 and the front exit surface of the extruder head 12 can be adjusted as required by sliding the rod 84 axially in the head 12, the rod 84 being lockable in any required position by means of a pointed-end screw 91 disposed in a lug 92 of the flange 68.

Via the axial holes 87, 88 in the annular support members 85, 86, the gap 98 can communicate with atmosphere; the gap 98 is bounded axially by the mandrel 83 and the front surface of the head 12 and radially by the rod-like part 84 of the mandrel and by the inside surface of the sheath 80 which is being formed. Communication between the holes in the two annular support members 85, 86 is by way of the annular gap between the outside cylindrical surface of the rod-like part 84 of the mandrel 83 and the bore in the inner tubular members 67, 73.

The mandrel 83 is hollow and has provision for internal cooling by fluid flow, diagrammatically shown as supplied by a pipe 101 which is connected to an outside cooling fluid source and the fluid enters the mandrel at end 103 thereof, to leave the mandrel through a connection 105 at the rear part of the rod-like portion 84 of the mandrel.

Screwed into mandrel end 103 is one end of a mandrel tube 112 which, as will be seen hereinafter, can extend over the whole length of the machine to inside the extractor 24. A line 114 connects the inside of the tube 112 to a source of compressed air at a pressure e.g. of about 2 kg./cm.$^2$. Also disposed in the tube 112 are two rubber pipes 116, 117 which extend over the whole length of the apparatus and which are connected, via two lines 116A, 117A, to a line 118 for supplying compressed air at a higher pressure than the air supplied via the line 114, e.g., at about 4 kg./cm.$^2$, by way of two electrically operated valves 119, 120 respectively. The front ends of the pipes 116, 117 are inside the extractor 24 where they supply inflatable moving plugs (FIG. 18) which will be described hereinafter.

FIGS. 4 and 5 show the complete head extractor 13 and details of its actuation. The extractor 13 mainly comprises two bottom rollers 121, 122 (FIGS. 6–8) against which two top bearing rollers 123, 124, respectively, apply the formed sheath 80. The four rollers 121–124 are of natural or synthetic rubber to give good adhesion and drive the sheath reliably. The bottom two rollers 121, 122 are rigidly connected to a bottom horizontal shaft 125 mounted in two bearings 126, 127 disposed in two flanges 128, 129, respectively, of a frame 131 mounted on the first centreless machine or device 14. The bottom shaft 125 is rotated by the shaft 26 (see also FIGS. 1, 2 and 4, 5) via a transmission comprising a bevel gear 134 mounted at one end of the bottom shaft 125, another bevel gear 135 which meshes with the bevel gear 134 and which is secured to a shaft 136 mounted in a bearing 137 rigidly secured to a right-angled bracket 138 secured to the flange 129, a toothed wheel 142 secured to the shaft 136, a chain 143 running around the toothed wheel 142 (see also FIGS. 4 and 5), a toothed wheel 144 around which the chain 143 also runs, an intermediate shaft 145 mounted in a support member 146 disposed on a plate 147 secured to the floor or ground, a gear wheel 148 also secured to the shaft 145, and a gear wheel 149 which meshes with the gear wheel 148 and is secured to the corresponding end of the main shaft 26.

The top two rollers 123, 124 are rigidly connected to a shaft 161 running in two bearings 162, 163 vertically slidable in two slots, such as the slot 164 (FIG. 8) in the flange 129 of the frame 131. Two compression springs 165, 166 resiliently bias the two bearings 162, 163 towards the bottom two bearings 126, 127; one end of each spring 165, 166 bears against the top of the corresponding bearing and the other end bears against a plate, as 167, which can slide vertically in the slot 164 on two rods 168, 169 rigidly connected to the flange 129 and which in turn bears against the bottom end of a screwthreaded adjusting rod 171 (or 172) disposed in a cross-member 173 (or 174) secured to the top of the corresponding flange by screws, as 175. The two threaded rods 171, 172 have control hand wheels 177, 178 via which they can be rotated to provide an arbitrary adjustment of the biasing of the top shaft bearings by the springs, so that an appropriate adjustment can be made of the pressure between the top rollers 123, 124 and the bottom rollers 121, 122 which clamp the sheath 80 between themselves to advance the same.

The two shafts 125, 161 have two identical gear wheels 181, 182, respectively, which mesh with one another, so that the top rollers which have the same diameter as the bottom rollers, are driven at the same peripheral speed as the latter. The tube 112 is continued throughout the extractor 13 by a reduced-diameter intermediate tubular member 184, to ensure that the rollers on each shaft can come close enough together to advance a sheath of relatively reduced diameter.

FIG. 9 is a diagrammatic perspective view of one of the three elementary centreless machines having the references 14, 18, 19 respectively, in FIG. 1. This machine, which is conventional, will not be described in detail; it will just be mentioned that its main items are, for instance, a ring or hoop 191 centred on three rollers 192, 193, 194 whose axes are horizontal and which are rotatably mounted on an appropriate support member and which, like all the other moving parts of the apparatus, are driven by the main driven shaft 26. The ring 191 bears reels, as 195, 196, of tapes or strips or the like 197, 198; consequently, as the ring or hoop 191 rotates, the tapes 197, 198 are wound helically around the article which, in this particular case, is the sheath 80.

FIGS. 10 and 11 show the system which has the general reference 15 in FIGS. 1 and 2 and which serves to distribute longitudinal filaments or threads. The system 15 is mounted on a base member 201 (shown only in FIG. 1) and mainly comprises a plane vertical frame 202 transverse to the general direction of the apparatus, and a funnel 203 which extends coaxially of the sheath 80 to be covered with longitudinal threads. The frame 202, which can be formed, for instance, by appropriately bent tubing, has two vertical support arms 205, 205', two bottom arms 206, 206' inclining upwards and outwards at an angle of 30°, two side uprights 207, 207', one top horizontal arm 208, a reversing frame which has the general reference 209. Frame 209 takes the form of an equilateral triangle concentric with the sheath 80 and disposed in the plane of the rectangular frame 202, the frame 209 having a top horizontal side 211 secured to the two uprights 207, 207' respectively by two rods 212, 212'. The vertex opposite the side 211 is connected to the tops of the two arms 205, 205' by a horizontal rod 213, its two other sides having the references 214, 214' respectively.

The base of the funnel 203 is formed by the frame 209 and the top of the funnel 203 is formed by the two coaxial rings 216, 217 disposed in the same transverse vertical plane. The outer ring 217 is secured to the three vertices of the frame 209 by three oblique rods 218, 219, 220, respectively. The inner ring 216 is borne by the outer ring 217 via radial crosspieces 221.

In the example shown, all the threads coming from the creel 16 (FIGS. 1 and 2) are grouped to form three sheets of threads having the respective references 225A, 225B, 225C, and the three sheets are visible in FIGS. 10 and 11. The central sheet 225B arrives substantially horizontally above the machine, goes over the top horizontal arm 211 of the frame 209, then descends at an inclination and goes between the two rings 216, 217, and is then deposited, lengthwise on the sheath 80. The sheet 225A also goes over the top horizontal arm 208 of the frame 202, descends vertically, goes below the inclined arm 206 of the frame 202, then goes on the inside of the inclined side 214 of the frame 209, and then goes between the two rings 216 and 217. The third sheet 225C follows a path which is symmetrical to the path followed by the sheet 225A in relation to the central longitudinal vertical plane of the apparatus. Of course, any other number, any other arrangement of the sheets of threads, or any other means for placing the same lengthwise on the sheath 80, can be used.

FIG. 12 is a view, to an enlarged scale and with parts broken away, of the resin injection pipette 61 shown in FIG. 1. The pipette 61 comprises a tube 251 of flattened cross-section, as the end view to an enlarged scale in FIG. 13 shows; at its rear end the tube 251 communicates with the tube 46B connected to the pump 46. The overall cross-section of the tube 251 decreases from rear to front, to terminate near the sheath 80 which has already received longitudinal threads as 225A, or tapes or the like and which is sliding on the tube 112. That end of the tube 251 which terminates near the sheath 80 is disposed in a longitudinal recess 255 in a guide 257 which is of tubular shape and which is formed with two other longitudinal recesses 258, 259 receiving two more pipettes similar to the pipette 61. Pipettes can be provided in any required number.

The length of the recess 255 as developed in a transverse plane (FIG. 13) is equal to the length of the corresponding circumference arc on the sheath 80, so that the sheath, which is originally cylindrical, can without damage become curved as it goes between the pipette 251 and the recess 255, then resume its cylindrical shape. The guide 257 is secured to the tube 112 by means of a ring nut 259 (FIG. 12) which clamps a ring gasket 261 against an inner shoulder of the guide 257 and against the outside surface of the tube 112. The pipettes deliver at places where the sheath 80 has already been covered with glass fiber threads or filaments or strips placed on the sheath 80 as the same passed through the first centreless machine 14 and the system 15 (FIG. 1), and preferably, and more accurately, in the zone where the second centreless machine 18 applies the threads or tapes or the like 260 (FIG. 12).

The resin may be heated prior to being impregnated into the fiber and, without the provision of special measures, the resin will immediately set within the exchanger which heats it, and will clog the exchanger. For this purpose, means are provided to add the complementary liquid or catalyzer to the resin within the injection means itself. In FIGS. 12 and 13, such a means is illustrated in conjunction with an injection by means of pipettes. A rod 502 is rotated by a motor 503, and the agitation thus produced effects mixing of the substances. In this manner, the length of time elapsed between the moment when the catalyzer is added to the resin and the moment when the mixture of resin and catalyzer is impregnated in the reinforcing fibers, is approximately 0.5 second so that the resin has not had sufficient time to harden whereby it may be brought to a temperature of up to 120° C. This makes it possible to dispense with heating means of the funnel-type as usually used for hardening the tube being fabricated.

Also visible in FIG. 1 is a sealing gasket 273 on which the sheath 80 slides, in support of a tube 180 being manufactured. As FIG. 14 shows, the gasket 273 mainly comprises a tubular metal member 275 bearing an inflated rubber sleeve 274 covered by segments or a low-friction fabric, for instance, of "Teflon," against which the inside surface of the sheath 80 rubs, so that, as will be seen hereinafter, a hermetic chamber which can be supplied with compressed air is formed downstream of the gasket 273. The rear end of the member 275 is reduced to facilitate the sliding of the sheath 80. The segments 276 are retained at the front by an annular shoulder 275A of the member 275 and at the rear by a ring 277 rigidly secured to the member 275. A screwthreaded plug 278 compresses a ring gasket 279 in an annular recess in the front surface of the member 275, the gasket 279 threfore being urged against the outside surface of the tube 112 and thus helping to seal the bore in the gasket 273 and secure the same to the tube 112. The rubber sleeve 274 has a valve 280 via which the pressure in the sleeve 274 can be maintained periodically.

FIG. 15 is a diagrammatic view showing the drive system for one of the elementary centreless machines, for stance, of the machine 19 (see also FIGS. 1 and 2). The ring 313 of the machine 19 is driven off the main drive shaft 26 via a transmission comprising a pulley 314 rigidly secured to the shaft 26, a belt 49 running around the pulley 314, a pulley 316 secured to input shaft 317 of a speed-varying device 39, the belt 49 also running around the pulley 316, output shaft 319 of the speed-varying device 39, a pulley secured to shaft 319 and a belt 321 running around the pulley 318 and the ring 313. The speed-varying device 39 has a clutch (not shown) controllable by a handle 324. The other two centreless machines 14, 15 are driven similarly off the shaft 26 via transmissions comprising belts 47, 48 respectively (FIG. 2) and speed-varying devices 37, 38 respectively. The devices 37–39 are mounted on two rails 41, 42. FIG. 15 also shows the transmission 51 for driving the drive shaft 50 for the three pumps 44–46 (FIG. 2).

FIGS. 16 and 17 show the extractor 24. The embodiment shown comprises two endless caterpillars or belts 336, 336' biased resiliently against the finished tube 180 to be moved. The extractor 24 is conventional and can have more driving belts than are shown. The top belt 336 runs around two pulleys 337, 338 whose spindles 341, 342 are mounted in two end plates or the like, as 343, each borne by two inclined arms 344, 345 whose bottom ends are articulated to the end plates 343, while the top ends are articulated to two spindles 346, 347 disposed in support members 348, 349 rigidly connected to the extractor frame 350. The belt 336 is therefore disposed in a system forming a link parallelogram which can move towards or away from the similarly disposed bottom belt 336'. Elements associated with the bottom belt have the same references as elements associated with the top belt, plus a prime. A resilient element, such as a compressed-air ram 351 having one end connected via a pivot 352 to the machine frame and the other end connected via a pivot 353 to the end plates 343, resiliently biases the top belt towards the bottom belt.

The top belt 336 is driven from the single electric motor 29 (which drives all the other elements of the complete apparatus via the main shaft 26) via a transmission comprising: a bevel gear 355 secured to the shaft 342; a bevel gear 356 which meshes with the bevel gear 355 and is secured to a longitudinal shaft 357; a universal joint 358; a longitudinal shaft 359; another universal joint 361; a shaft 362 running in a bearing 363 secured to the frame or casing 350; a sprocket 364 secured to the shaft 362; a chain 365 which runs around the sprocket 364; a sprocket 366 around which the chain 365 runs and which is rigidly connected to a shaft 362' for driving the bottom belt 336', in just the same way as the shaft 362 drives the top belt 336, the shaft 362' running in a bearing 363', while the chain 365 also runs around a sprocket 371 (FIG. 17) secured to an output shaft 372 of a speed reducer 370. Input shaft 373 thereof has on it a pulley 374 engaged by a belt 375 which also goes over a pulley 376 rigidly secured to an intermediate shaft 377 connected to shaft 382 of motor 29 by a transmission comprising a pulley 378 rigidly connected to the shaft 377, a belt 379 engaging with the pulley 378, and a pulley 381 with which the belt 379 engages and which is rigidly connected to the motor shaft 382. The shaft 26 is driven from the speed reducer output shaft 372 via a transmission comprising a pulley 407 rigidly connected to the shaft 372, a belt 408 engaging with the pulley 407, and another pulley 409 with which the belt 408 engages and which is secured to the shaft 26.

Figure 18:
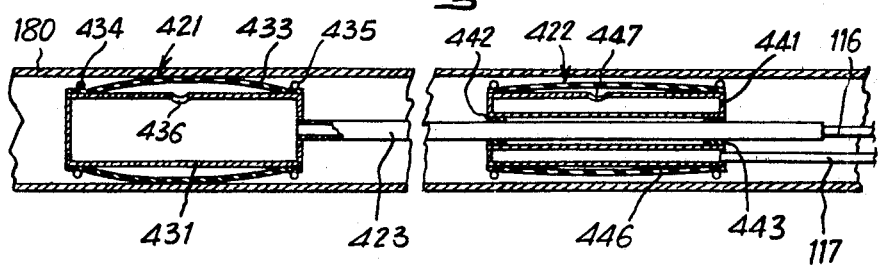
FIG. 18 is a view in elevation of the system comprising two moving plugs and their actuation.

FIG. 18 shows a system of movable sealing plugs received in that part of the tube 180 which is inside the extractor 24 (FIG. 1) at the downstream end of the complete apparatus. The moving-plug system comprises a downstream plug 421 and an upstream plug 422. The downstream plug 421 is secured to the downstream end of a tubular support member 423 slidable in the upstream plug 422. The downstream plug 421 takes the form of a cylindrical tubular member 431 (FIG. 18) whose upstream end is secured to the downstream end of the tube 423. The tubular member 431 is encircled by in inflatable flexible covering 433 which is made of natural or synthetic rubber and which takes the form of a generally cylindrical sleeve whose two ends are clamped against the corresponding ends of the body 431 by clips or the like 434, 435. The annular gap between the inside surface of the sleeve 433 and the outside surface of the member 431 communicates with the inside thereof and with the inside of the tube 423 via an orifice 436 in the member 431.

The upstream plug 422 is of a construction similar to that of the downstream plug and comprises a tubular member 441; however, member 41 is annular and is slidable on the tube 423 in sealing-tight manner, with the interposition of two sealing gaskets 442, 443 of any appropriate conventional kind, for instance, ring gaskets. The gap between the inflatable rubber sleeve 446 and the outside surface of the tubular member 441 communicates with the inside thereof via an orifice 447 therein.

In order that these two plugs may operate in a program to be described hereinafter in a description of the operation of the complete apparatus, provision is made for the two plugs to be alternately inflated and deflated from the compressed air line 118 (FIG. 3) by operation of two electric valves 119, 120 and by the use of the two pipes 116, 117, the pipe 116 being connected to the downstream plug 421 (FIG. 18) and the pipe 117 being connected to the upstream plug 422.

The pipe 116 is made of rubber and, as the reference 116B in FIG. 12 shows, has a helically wound part. Similarly, the pipe 117 is made of rubber and also has a helically wound part, as the reference 117B in FIG. 14 shows. Because of these helical portions, the two plugs can move axially while always staying connected to the two electric valves for alternately distributing air to them and connecting them to atmosphere. Means are also provided to resiliently draw the plugs to the rear; in the example shown the latter means take the form of ordinary rubber bands, as 451 (FIG. 12) and 452 (FIG. 14), pierced with a number of holes through which the turns of the helical parts of the two corresponding pipes are threaded. When the helical part of a pipe is elongated, the corresponding rubber band also elongates and tends to press the turns together and therefore to return the plug to which it is connected.

The valves 119, 120 are energized by a network having one pole 454 (FIG. 3), for instance the negative pole, taken directly to the valves while the other pole 455 (FIG. 6)—i.e., the positive pole in the example—is connected to the valves 119, 120 via a changeover switch 456 and two conductors 458, 459 respectively (see also FIG. 3). The switch 456 is operated by a cam 461 (FIGS. 6-8) which is, in shape, semicircular and which is secured to shaft 125 of the bottom rollers of the extractor 24; the switch 456 is mounted on a bracket 460 rigidly secured to the extractor frame 131. The valves 119, 120 therefore operate in synchronism with the linear advancing movement of the sheath 80.

The apparatus operates as follows:

It will be assumed that the machine has already been "primed"—i.e., that a tube being formed already extends over the whole length of the apparatus and issues at the downstream end of the apparatus, as indicated by the reference 180. The sheath 80, for instance, of polyvinyl is formed at the exit from the extruder head 12 (FIGS. 1-3). It is sized to final diameter as it goes over the mandrel 83; the same is cooled by a flow of fluid, for instance, water, which enters via connection 108 at the rear of the extruder head and flows through the pipe 101, then returns through the space 102, removing heat from the mandrel 83, and leaves via connection 105, so that there is no risk that the sheath, which is still hot when it leaves the extruder, may stick to the mandrel. The annular space 98 between the rod-like part 84 of the mandrel and the sheath 80 being formed is at atmospheric pressure to the rear of the head 12, as hereinafter described wih reference to FIG. 3.

The compressed air at a pressure of 2 kg./cm.$^2$ which, while the tube 112 enters the sheath 80 between, on the one hand, the system comprising the two movable end plugs 421, 422 (FIG. 18) and, on the other hand, the gasket 273 (FIG. 14) experiences a leakage between the gasket 273 and the sheath 80, the leakage being, for instance, of the order of 0.1 kg./cm.$^2$ and reaching the sizing mandrel 83 (FIG. 3) in the head of the apparatus. The air leakages are removed via the annular space 98, which communicates with atmosphere, and therefore cannot upset extruder operation.

Upon leaving the extrusion head the sheath 80 is taken up by the first extractor 13 and drawn over the whole length of the machine by the caterpillar type delivery extractor 24. The first extractor 13 regularizes the delivery of the sheath 80. If only the delivery extractor 24 at the downstream end of the machine pulled the sheath 80, the same would be delivered irregularly because of its resilience.

As well as providing a sizing action, the mandrel 83 forms a gasket which prevents the air at a pressure of 0.1 kg./cm.$^2$ from entering the zone between the extruder and the mandrel 83, for any such entry would upset sheath formation.

Going through the first centreless machine 14 the sheath receives a first fiber glass sheet 14A, whereafter the sheath receives a sheet of longitudinal threads 225A, 225B, 225C in the machine 15. In the second centreless machine 18 the sheath receives a second sheet of fiber glass threads or tapes or the like 260 which are wound helically and, preferably, to the opposite hand in respect of the winding produced by the first centreless machine 14. In the zone where the second centreless machine 18 places the fibers on the sheath, the ends of the pipettes 61 place curable thermoplastics. The pressure applied by the winding in this machine forces the resin to thoroughly penetrate between the longitudinal threads laid by the machine 15 and the first sheet of helical filaments laid by the machine 14. More accurately, the end of the top pipette 61 (FIGS. 12 and 13), such end being disposed in the recess 255 in the support member 257, coincides exactly with the place where the fibers 260 are laid helically, but the ends of the two similar pipettes received in the bottom recesses 258, 259 coincide with a slightly more advanced place where the fibers have already been laid helically both on the sheath, which has already received the first threads and fibers, and on the end portion of the last-mentioned two pipettes, so that the same really do inject resin into the thickness of the sheath covering; consequently, the resin cannot run away outside the covering. This risk does not occur with the top pipette since the same lays its resin on the top of the sheath.

The sheath, having thus been "bound" or covered, continues on its way and enters the third centreless machine 19 where overlapping strips 19A, for instance, of polyvinyl chloride, are wound helically on the sheath.

As a variant, after the final fiber glass sheet has been deposited and after impregnation has been effected, a thin layer of a potting plastics, for instance, polyethylene, can be deposited continuously, for instance, by means of a square head. This layer can be colored; it gives the tube a smooth surface and ensures that the impregnating plastics of the laminate does not drip during subsequent operations, particularly in the polymerizing oven 22.

The compressed air which enters the connection 114 (FIG. 3) at a pressure of 2 kg./cm.$^2$ leaves the tube 112 (FIG. 14) immediately downstream of the stationary gasket 273 and enters the sheath, so that the same has a satisfactory strength, increased by the binding which it has received, the tightness of the binding also being improved. Also, the air pressure helps in the advance of the formed tube 180 and correspondingly reduces the work required from the two extractors 13, 24. Also, the air pressure produces a strong connection between the sheath and the longitudinal reinforcing threads so that the threads as well as the sheath experience the pull applied to the forming tube to slide the same along the mandrel.

The fabricated tube is therefore moved constrainedly into the polymerizing oven 22 and, having travelled through a cooling zone, enters the delivery extractor 24. The belts thereof engage with the tube; the same is still at the internal pressure of 2 kg./cm.$^2$ and has in it the end plugs 421, 422, either one or the other of which permanently closes the tube by reciprocating therewith and which, being inflated to a pressure of 4 kg./cm.², form a solid core to withstand the force with which the belts engage with the tube. The same leaves the extractor 24 fully finished, as denoted by the reference 180 in FIG. 1 and the only remaining job is to cut the tube to length.

The three centreless machines 14, 18, 19 and the input or first extractor 13 are driven by the shaft 26 which is driven by the output extractor motor, as hereinafter described. The longitudinal threads guided by the device 15 are pulled along on their own in proportion as the tube advances, the downstream part thereof having already been provided with threads and having already set.

The two movable end plugs 421, 422 operate as follows:

Referring to FIG. 19, the upstream plug 422 is shown as being inflated and is therefore moved downstream, in the direction indicated by an arrow $f$, by the formed tube 180; in its downstream movement the plug 422 pushes before it the deflated plug 421. Compressed air is supplied to the plug 422 from the line 118 (FIG. 3) via the valve 120, which the switch 456 is at present energizing, and through the rubber pipe 117. That internal part of the formed tube 180 which is disposed between the end plug 422 and the gasket 273 therefore experiences the 2 kg./cm.² air pressure. The downstream plug 421 communicates with atmosphere via the tube 423, the rubber pipe 116 and the valve 119; the latter is at present open to atmosphere since it is not energized.

When the two plugs reach the positions shown in FIG. 20, the formed tube has advanced by a length equal to half the length of the perimeter of the driving rollers of the first or input extractor 13. The cam 461 operates the switch 456 which connects the valve 120 and therefore the pipe 117 to atmosphere, whereas the valve 119 is operated to allow compressed air to enter the pipe 116. The plug 421 inflates and the plug 422 deflates.

The sheath 80, which is in clamping engagement with the plug 421, moves the same from the position shown in FIG. 20 to the position shown in FIG. 21, but the plug 422 is returned to the rear by its rubber pipe 117. The cam 461 has by then performed another half-revolution and alters the position of the switch 456; the upstream plug 422 inflates (FIG. 22) while the downstream plug 421 deflates and is returned by its rubber 119 towards the upstream plug 422 into the position shown in FIG. 19. Consequently, each of the two plugs 421, 422 is driven consecutively by the tube 180 which each plug closes while the other plug is returned resiliently in the upstream direction. The downstream end of the formed tube is therefore closed permanently.

As a variant, the two-plug system 421, 422 can be replaced by a single stationary plug of the kind which is shown in FIG. 14 and which has the general reference 273; in this event, the tube 112 must of course be prolonged into the zone of the output extractor 24.

The description of the foregoing embodiment refers to a system 15 for placing sheets of longitudinal reinforcing threads on the sheath. As a variant, tapes or bands of, for instance, braised or woven fibers, in any desired number, can be used instead of sheets of threads.

FIG. 24 diagrammatically shows another system for impregnating the filiform reinforcement of the sheath. This system comprises a reservoir 581 which contains catalyzed and accelerated resin and which communicates via a line 582 with an appropriate metering pump (not shown) operating in dependence upon the rate of advance of the formed tube 180 when the same, covered with its reinforcing threads, goes through an entry aperture 584 and exit aperture 585 in the reservoir 581. The same, which is of very reduced size, is preferably cylindrical. The two apertures 584, 585 have any conventional sealing means, for instance, labyrinth seals, or else, and as shown, gaskets 586, 587 comprising inflatable annuli 588, 589. Preferably, the annuli are inflated by a cooling fluid, in order to reduce resin losses by making the resin more viscous and preventing accidental polymerization of the resin in the gaskets. Preferably, the reservoir 581 is supplied with resin from a pressurized mixer, supplied by the pump, to facilitate penetration of the laminate by the resin. In other words, the mixer receives the resin, catalyst, accelerator, and, where applicable, loading and colouring agents.

A number of impregnating reservoirs of this kind can be provided, inter alia after the winding of each fresh sheet of fibers or threads or fabric, in which event the catalyzed accelerated resin can be supplied either from a number of mixers supplied by a single bank of dispensing pumps or from impregnating reservoirs each having its own mixer and its own bank of dispensing pumps.

In the embodiment shown, a vacuum chamber 592 is disposed upstream of the reservoir 581 and is connected to a negative pressure source to as to ensure thorough removal of the air from between the fibers of the laminate, to further facilitate penetration of the laminate fibers by the resin. Sealing-tightness at the vacuum chamber exit is provided by the gasket 586 at the entry to the impregnating chamber 581; the entry to the vacuum chamber has another appropriate gasket—in the particular example, a gasket 594 comprising an inflatable annulus 595.

This system, which can inject cold resin into the laminate, can be used instead of the injection pipettes, as 61, hereinafter described.

FIGS. 25–27 show another embodiment enabling the tube to be heated by high frequency electric currents. This embodiment has electrodes 601–604 encircling the tube to be polymerized, but without touching the same, over half its periphery, and other similar electrodes 606–609 which encircle the tube on the other half of its periphery. The electrodes 601 and 604 are connected by cables 612, 613 respectively to the output of a high frequency generator 611. For convenience reasons, the bottom electrodes, such as e.g. the electrode 603, form half-shells hinged via a horizontal hinge 613 to the corresponding top electrodes, e.g. the electrode 608, forming the other half-shell. The two electrodes 602, 603 are interconnected by a longitudinal conecting rod 614, and a similar rod 615 similarly interconnects to two top electrodes 607, 608.

More generally, the electrodes which encircle the tube being polymerized but without contacting the same are provided in an even number, the end electrodes being connected one each to the two output terminals of the high frequency generator 611. When all the electrodes are interconnected in series, a high frequency circuit is formed between the electrodes and the tube 112 capacitatively, via the tube 180 which heats up. There are inclined spaces, as 616, between electrodes, to ensure that some generatrices of the tube are not less thoroughly polymerized than others.

FIG. 28 shows another embodiment enabling the tube to be heated by hyper-frequency electric currents. Such currents, which are of a frequency e.g. of around 2450 mc./s., are supplied by a transmission line, the wave which travels therealong being progressively absorbed by the tube wall near the line. In the example shown the transmission line takes the form of a conductor 621 wound helically, for instance, with a 15 mm. pitch, on a 1 mm. thick insulating tube 622 e.g. of "Teflon." A metal tube 623 encircling the helical conductor 621 acts as a reflector and reduces radiation losses. One end of the conductor 621 is connected to a hyper-frequency generator 625 and the other end of the conductor 621 is connected to an appropriate load, such as a water-filled reservoir 626, which absorbs those waves not absorbed by the tube 180 to be heated.

FIGS. 29 and 30 show a variant of the system shown in FIG. 28. In FIGS. 29 and 30 the conductor 631 is divided into two parts—a top conductor 631 and a bottom conductor 632 each having in plan a zig-zag pattern, as shown in FIG. 29, whereas when seen end-on each conductor forms a partial cylindrical surface around the tube 180 to be heated. The ends of each of the two conductors 631, 632 are respectively connected to a genterator and a load, such as the corresponding elements 625, 626 in FIG. 28. top reflector 635 and bottom reflector 636 encircle the respective component conductors.

It has been assumed in the foregoing that upon leaving the pump 46 the resin is at ambient temperature and is mixed with the catalyst. Consequently, the resin and catalyst are mixed together before entering the injection pipette 61 and the resin is polymerized later while going together with the tube into the oven 22 of whatever kind (infra-red radiation, high frequency or hyperfrequency). Alternatively the resin can be heated in an appropriate heat exchanger (not shown) to a temperature of about 100° C. immediately on leaving the pump 46, and the catalyst can be introduced directly into the pipette 61, as denoted by the reference 501 in FIG. 12, in which event the resin polymerizes immediately after deposition on the tube as it leaves the pipette, in which event the oven 22 is not used. In this case, to ensure that the catalyst and resin mix inside the pipette, a rod 502 rotated, for instance, by a three-phase micromotor 503 can be used, as shown in FIGS. 12 and 13.

Instead of a thermosetting resin, a thermofusible resin can be used. To this end, devices as the pipettes 61 can be supplied with thermofusible resin liquified by heating before it enters pumps, as 46, and setting as it cools on the sheath. In this event the oven 22 is not used.

The various features outlined lead to the production of a hermetic laminated tube which is very strong even if its wall is very slight or thin. For some low pressures the wall can be so slight that the tube is insufficiently rigid. To obviate this, a sandwich wall can be formed by a layer of a cheap material, such as phenol foam or polyurethane foam or expanded or unexpanded polystyrene, being interposed between two layers of laminate. The layer of cheap material can be positioned continuously, for instance, by an extruder having a square head through which the tube for treatment passes, or by injection means of the kind shown in FIG. 24, at a place disposed, for instance, between the first two centreless machines 14 and 18, such a place having the reference 100 in FIG. 1.

Whichever of the means hereinafter described are used, the resulting tube takes the form shown in FIG. 23 of a sheath 80, for instance, of polyvinyl, covered by reinforcing threads or braids or tapes, for instance, of glass fibers 14A, 225A, 225B, 225C, 260 impregnated with a curable resin, the whole possibly being covered by a layer of a substance such as polyvinyl chloride or cellophane 19A, to increase the abrasion resistance of the tube.

The invention is not of course limited to the embodiments described and shown and many modifications can be made without departure from the scope of the invention. For instance, the sheath, instead of being produced by an extruder, can be manufactured by any other appropriate means, for instance, by longitudinal edge-to-edge welding of two hemicylindrical half-shells.

What is claimed is:

1. Apparatus for manufacturing tubes, of the type including an hermetic plastic tubular sheath having bonded thereto an external layer of high strength reinforcing material, said apparatus comprising, in combination, an extruder for continuously fabricating a tubular plastic sheath, and having an exit for the sheath; a tubular cylindrical sheath-sizing mandrel extending from the exit of said extruder and having an outer diameter equal to the inner diameter of the sheath to effect such sizing of the sheath; first sheath extracting means spaced a short distance from said mandrel in the direction of sheath movement and arranged to engage the sheath and move the sheath axially outwardly along said mandrel; means operable to apply reinforcing elements in the dry state, to the external surface of the sheath at a location spaced downstream from said first sheath extracting means; a tubular extension extending coaxially from said mandrel and having an outer diameter which, except at said location, is less than the inner diameter of the sheath, the outer diameter of said tubular extension, at said location, being equal to the inner diameter of the sheath; injection means operable to inject a curable plastic, in the fluid state, between the reinforcing elements; closure means disposed in the downstream part of the tube during production thereof; means connecting the interior of said tubular sizing mandrel and the interior of said tubular extension to a source of fluid under pressure to pressurize the interior of the fabricated tube; venting means venting the space between the sheath and said sizing mandrel at the exit from said extruder; sealing means carried by said tubular extension at the location of said means for placing the reinforcing elements on the sheath, and slidably engaging the interior surface of the sheath; and second sheath extracting means positioned at the exit from said apparatus.

2. Apparatus as set forth in claim 1, wherein said mandrel has internal cooling fluid flow lines which extend to the rear of said extruder.

3. Apparatus as set forth in claim 1, wherein said tubular extension carries means, formed by an inflated plug and covered by a low-friction substance, on which the fabricated tube slides.

4. Apparatus as set forth in claim 1, wherein said injecting means are means for injecting a thermosetting resin and a complementary liquid for curing the resin, the apparatus also comprising heating means to polymerize the resin.

5. Apparatus as set forth in claim 4, wherein said means for injecting thermosetting plastics between the reinforcing elements are longitudinal pipettes connected by dispensing pumps to a pressurized resin reservoir and to a catalyst reservoir, the pipettes delivering resin in a zone where said elements are laid on the sheath.

6. Apparatus as set forth in claim 5, including a tubular substantially cylindrical support carried by said tubular extension; said support slidably engaging the inner surface of the sheath, and being formed with outwardly opening longitudinally extending grooves of arcuately curved cross section; each pipette extending along a respective one of said grooves into which the sheath is depressed; the length of the arc of each groove being equal to the length of the arc, having the same chord, on the sheath when the sheath has resumed its cylindrical shape after leaving said support.

7. Apparatus as set forth in claim 4, wherein said heating means for resin polymerization are disposed downstream of the resin-injecting means.

8. Apparatus as set forth in claim 7, wherein the means for heating the tube to be treated comprises at least one hyper-frequency-current transmission line which encircles the tube to be treated over at least part of the length thereof, one end of the line being connected to a hyper-frequency-current generator, the other end of the line being connected to a load, and a cylindrical metal reflector encircling the line.

9. Apparatus as set forth in claim 8, wherein each hyper-frequency line is wound as a coaxial helix around the tube to be treated.

10. Apparatus as set forth in claim 8, wherein each hyper-frequency line extends as a zig-zag over a hemicylindrical geometric surface coaxial of the tube to be treated.

11. Apparatus as set forth in claim 7, wherein said means for heating the tube comprise annular electrodes encircling the tube in closely adjacent relation thereto; and means supplying a high frequency current to said annular electrodes.

12. Apparatus as set forth in claim 11, wherein said electrodes include a plurality of electrodes connected in series with each other, there being an even number of intermediate electrodes; said intermediate electrodes being connected, externally, in pairs to a source of high frequency current.

13. Apparatus as set forth in claim 11, wherein each annular electrode is formed with an inclined slot.

14. Apparatus as set forth in claim 4, wherein said means for injecting thermal setting resin and a complementary liquid for curing the resin comprises a pressurized annular reservoir having a channel-shaped cross section having flanges facing toward the tube to be processed; said reservoir having an inlet for resin and complementary liquid under pressure; and seals at the upstream and downstream ends of said reservoir, said seals comprising tubular annuli embracing the tube to be processed and inflated under pressure.

15. Apparatus as set forth in claim 14, wherein said cylindrical reservoir is preceded by a cylindrical vacuum chamber having a construction substantially identical to that of said cylindrical reservoir and having a connection to a source of vacuum; and sealing gaskets at the upstream and downstream ends of said cylindrical vacuum chamber, said cylindrical gaskets comprising tubular annuli surrounding the tube to be processed and inflated by fluid under pressure.

16. Apparatus as set forth in claim 4, wherein said heating means for resin polymerization are disposed on said resin injection means immediately upstream of the discharge end thereof; said means for injecting a complementary liquid for curing the resin discharging into said resin injection means; and means operatively associated with both of said injection means and operable to mix the resin and the complementary liquid.

17. Apparatus as set forth in claim 1, further including, downstream of the means for placing the reinforcing elements on the sheath, a second extruder operable to extrude a protective layer of extrudable material on the exterior surface of the tube being processed.

18. Apparatus as set forth in claim 1, further comprising, between two consecutive means for placing reinforcing elements on the tube being formed, injection means operable to apply a foamed synthetic resin onto the exterior surface of the tube being formed.

19. Apparatus as set forth in claim 1, wherein said injection means are operable to inject a thermofusible resin between the reinforcing elements; and means connecting said injection means to storage and heating means for a thermofusible resin, said storage and heating means being operable to supply the resin to said injection means in the fluid state.

20. Apparatus for manufacturing tubes formed by a hermetic plastic sheath having a binding or serving of a high-strength laminate, comprising, in combination, means for continuously fabricating a plastic sheath; an inner tubular cylindrical sizing mandrel located at the exit from the plastic sheath fabricating means and the outer diameter of which is equal to the inner diameter of the sheath; sheath-extracting means adapted to move the sheath axially on the sizing mandrel and located at a short distance therefrom; means for placing dry on the sheath reinforcing elements such as threads or fibers or tapes or the like; means for injecting a curable plastic in the liquid state between the reinforcing elements; closure means disposed in the downstream part of the tube during production thereof; and means for connecting the interior of the tubular mandrel to an appropriate pressure fluid source, to pressurize the fabricated tube; said closure means comprising a system of two movable plugs which are selectively inflated alternately until they engage with the inner wall of the fabricated tube, so that each inflated plug is alternately moved along together with the tube while the other plug is deflated and is free to slide inside the tube, means being provided to return the deflated plug in the upstream direction.

21. Apparatus as set forth in claim 20, further comprising means for alternately inflating the two movable plugs and connecting the same to atmosphere, and resilient means permanently biasing the two plugs in the upstream direction, so that when either of the plugs is deflated it can be returned in the upstream direction.

22. Apparatus as set forth in claim 21, wherein the means for inflating the two movable plugs and connecting the same to atmosphere comprise two electric valves connected one each to the two plugs and to an appropriate compressed air source, said electric valves having energizing windings, the energizing windings of the valves being controlled by a changeover switch which operates in response to the advancing movement of the sheath.

References Cited
UNITED STATES PATENTS

| | | | |
|---|---|---|---|
| 2,519,375 | 8/1950 | Jargstorff et al. | 264—94 X |
| 2,723,705 | 11/1955 | Collins | 156—432 X |
| 2,760,549 | 8/1956 | Nash et al. | 156—149 |
| 2,810,424 | 10/1957 | Swartswelter et al. | 156—149 X |
| 2,888,954 | 6/1959 | Gates | 156—149 X |
| 3,067,803 | 12/1962 | Fleury | 156—431 |
| 3,080,269 | 3/1963 | Pollock et al. | 156—287 X |
| 3,128,216 | 4/1964 | Reed | 156—432 X |
| 3,138,511 | 6/1964 | Cadwallader | 156—431 |
| 3,296,661 | 1/1967 | Moustier | 264—89 X |
| 3,336,176 | 8/1967 | Medney | 156—173 |

JOHN T. GOOLKASIAN, Primary Examiner

M. E. McCAMISH, Assistant Examiner

U.S. Cl. X.R.

156—392, 432, 499, 500; 264—95